(12) United States Patent
Tsai

(10) Patent No.: US 7,243,762 B2
(45) Date of Patent: Jul. 17, 2007

(54) BICYCLE HANDBRAKE OPERATING DEVICE

(75) Inventor: Szu-Fang Tsai, Chang-Hua Hsien (TW)

(73) Assignee: Tektro Technology Corporation, Chang-Hua Hsien (TW)

( * ) Notice: Subject to any disclaimer, the term of this patent is extended or adjusted under 35 U.S.C. 154(b) by 213 days.

(21) Appl. No.: 11/047,633

(22) Filed: Feb. 2, 2005

(65) Prior Publication Data
US 2006/0169547 A1   Aug. 3, 2006

(51) Int. Cl.
B62L 3/00   (2006.01)

(52) U.S. Cl. .................. 188/24.22; 188/2 D; 74/502.2

(58) Field of Classification Search .............. 188/2 D, 188/24.22; D12/179; 74/502.2, 489, 506, 74/488
See application file for complete search history.

(56) References Cited

U.S. PATENT DOCUMENTS 2,529,447 A * 11/1950 Bodinaux et al. ............. 74/489
5,575,178 A * 11/1996 Wu ............................. 74/489
5,857,932 A *  1/1999 Sugimoto ..................... 474/82
5,913,388 A *  6/1999 Ota et al. ................. 188/24.22

* cited by examiner

Primary Examiner—Bradley King
(74) Attorney, Agent, or Firm—Troxell Law Office, PLLC

(57) ABSTRACT

A bicycle handbrake operating device is provided. The present invention utilizes a roller wheel to pull the brake wire so as to generate a longer pulling distance and to reduce the exerted force as well. The roller wheel is installed inside the handbrake operating device, and the brake wire goes around the roller wheel. When the operating lever is gripped, the brake wire slides along the roller wheel to achieve a longer pulling distance; the roller wheel's self rotation also reduces the exerted force. Additionally, the brake wire almost always remains a straight line during the pull, which makes the operation of the handbrake operating device smooth and the brake wire would undergo minimum wearing.

2 Claims, 5 Drawing Sheets

US 7,243,762 B2

BICYCLE HANDBRAKE OPERATING DEVICE

BACKGROUND OF THE INVENTION (a) Technical Field of the Invention

The present invention generally relates to bicycle handbrakes, and more specifically to a bicycle handbrake operating device using a roller wheel for lengthening the pulling distance of brake wire.

(b) Description of the Prior Art

Please refer to FIG. 6, which shows an operation scenario of a conventional bicycle handbrake operating device. As illustrate, when the operating lever is gripped for a distance S, the brake wire is pulled by the operating lever's angular torque for a distance L, which in turn causes the brake devices (not shown) to stop the bicycle.

Since the distance S is in direct proportion to the distance L, such a design is unfavorable to children, females, and seniors. For these people with weaker gripping force, the bicycle would fail or take a longer time to stop, which is a risk to the rider's safety. In addition, when the brake wire is pulled, it would undergo an angular movement θ whose friction, when the operating lever is released, would hinder the operating lever to return to its original position. The brake wire would also wear itself down and tear at the corner due to the friction after a period of use. The conventional handbrake operating device therefore requires a more effective design.

SUMMARY OF THE INVENTION

The primary purpose of the present invention is to provide a bicycle handbrake operating device to overcome the foregoing shortcomings of the conventional ones. The present invention utilizes a roller wheel to pull the brake wire so as to lengthen the pulling distance and to reduce the exerted force as well. The roller wheel is installed inside the handbrake operating device. The brake wire goes around the roller wheel and has its end fixedly locked. When the operating lever is gripped, the brake wire slide along the roller wheel to achieve a longer pulling distance; the roller wheel's self rotation also reduce the exerted force. Additionally, when the operating lever is release, the roller wheel's rotation would help the operating lever to return to its original position.

Another objective of the present invention to provide a handbrake operating device that could be adapted to various types of bicycles such as mountain bikes, cross-country bikes, comfort bikes, lady's bicycles, children's bicycles, etc., by installing roller wheels of different sizes in the handbrake operating device.

Still another objective of the present invention is to provide a handbrake operating device in which the brake wire would undergo nearly no angular movement. In the present invention, the brake wire is pulled along the tangent line of the roller wheel and therefore the brake wire almost always remains straight with very minor or no angular movement. As such, the brake wire's pulling and restoration are both smooth and there is no need to worry about the brake wire's wearing down.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

In the following, detailed description along with the accompanied drawings is given to better explain preferred embodiments of the present invention. Please note that some parts of the accompanied drawings are not drawn to scale or are somewhat exaggerated. It should be understood that this is for illustrative purpose and is not intended to limit the presentation in any way.

Figure 1:
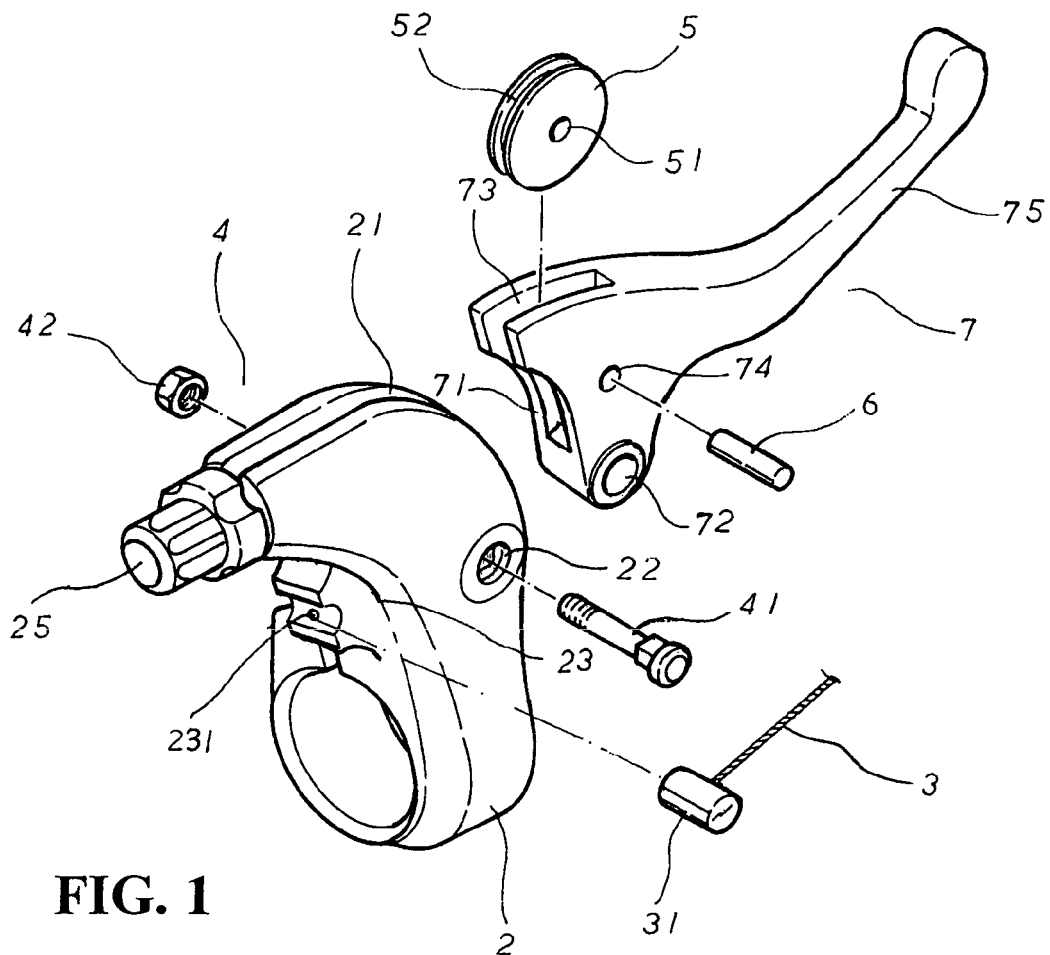
FIG. 1 is an explosion view of a handbrake operating device according to the present invention.
Figure 2:
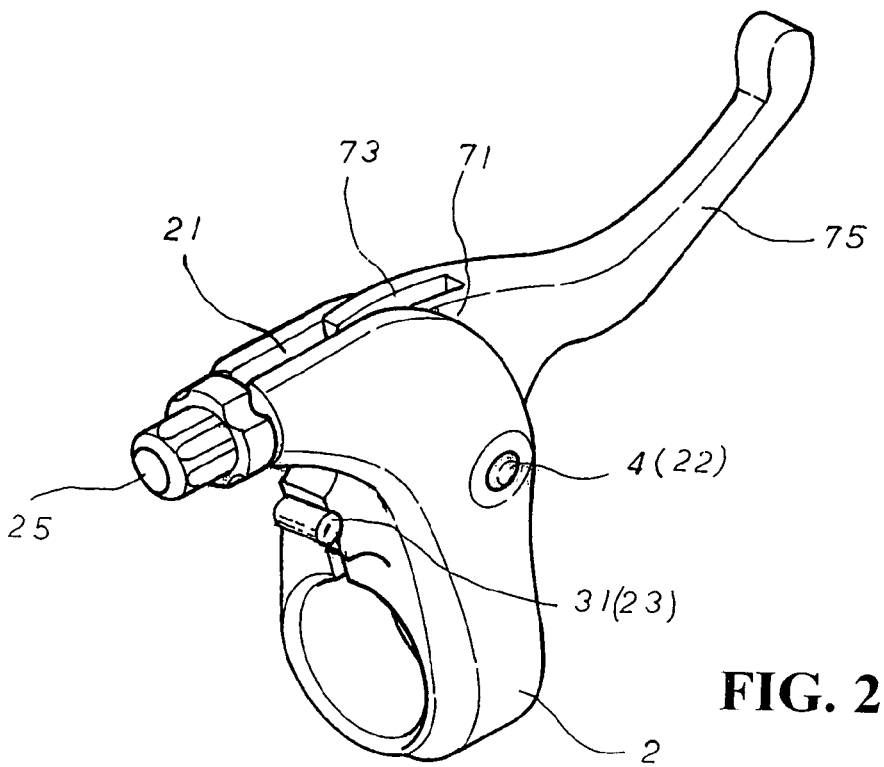
FIG. 2 is a perspective view of an assembled handbrake operating device according to the present invention.

Please refer to FIGS. 1 and 2. The handbrake operating device mainly contains a main member 2, a brake wire 3, a bolt member 4, a roller wheel 5, and an axle member 6, and an operating lever 7. The operating lever 7 has a joining section 71 at one end, which is fitted inside a trough member 21 of the main member 2 of the handbrake operating device. The operating lever 7 is pin-joined to the main member 2 by installing a bolt 41 through a pivoting hole 72 of the operating lever 7 and a pin hole 22 in the middle of the main member 2. The bolt 41 is then locked by the nut 42. On a side of the main member 2, there is a curved trough 23 for holding the wire head 31 of the brake wire 3. The major features of the present invention are as follows. First, the curved trough 23 has a wire hole 231 allowing the brake wire 3 to pass through the main member 2 when the wire head 31 is fitted into the curved trough 23. Secondly, the upper side of the joining section 71 of the operating lever 7 has a container trough 73 for accommodating the roller wheel 5. The roller wheel 5 is pin-joined to the operating lever 7 by installing the axle member 6 through an axle hole 74 of the operating lever 7 and a center hole 51 of the roller wheel 5. Thirdly, the brake wire 3 goes around the roller wheel 5 along the wheel gorge 52 and extends out through the main member 2's mouth member 25. FIG. 2 is a perspective view showing an assembled handbrake operating device according to the present invention.

Figure 3:
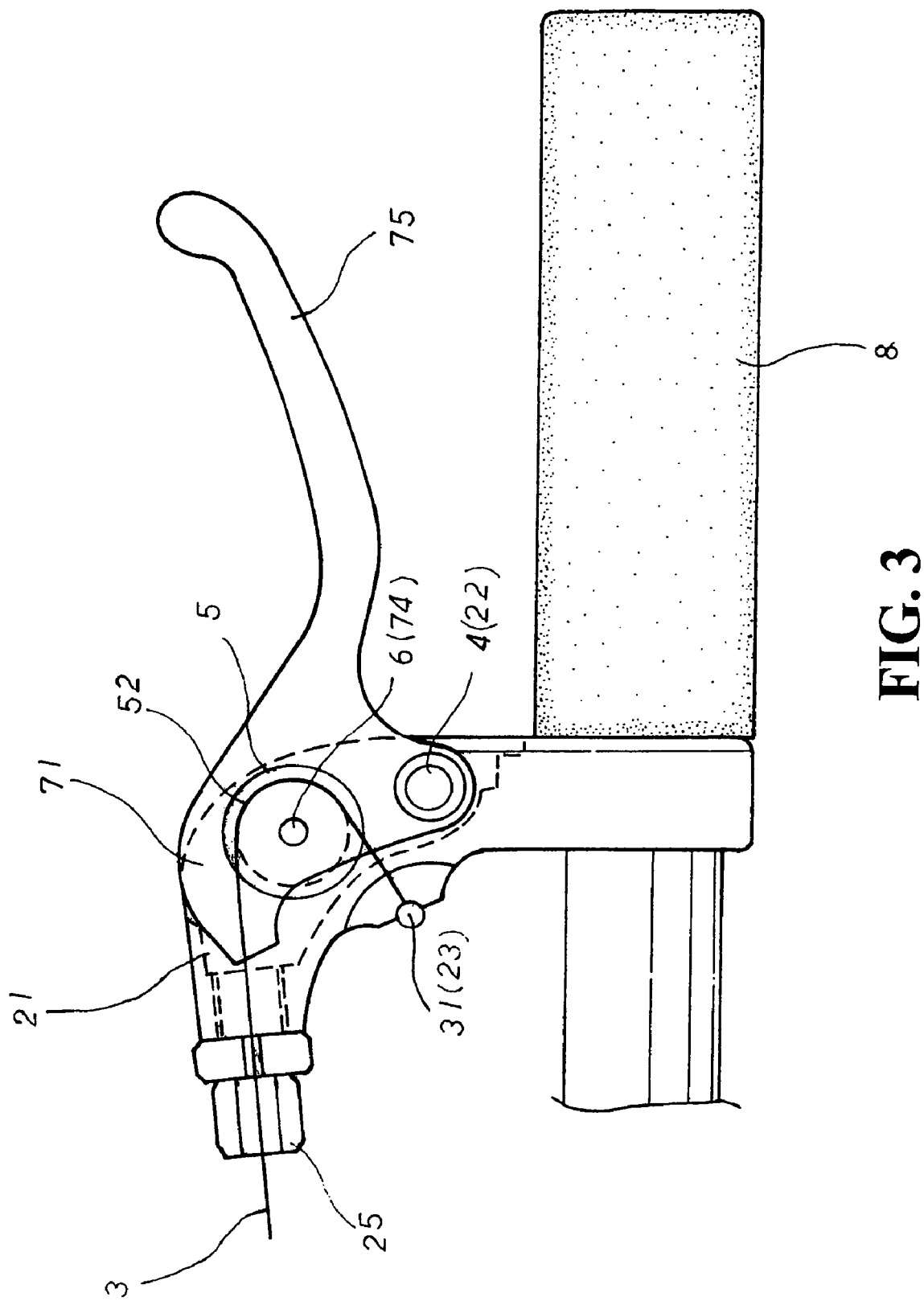
FIG. 3 is a plain view showing a handbrake operating device according to the present invention installed on a handlebar under a normal condition.
Figure 4:
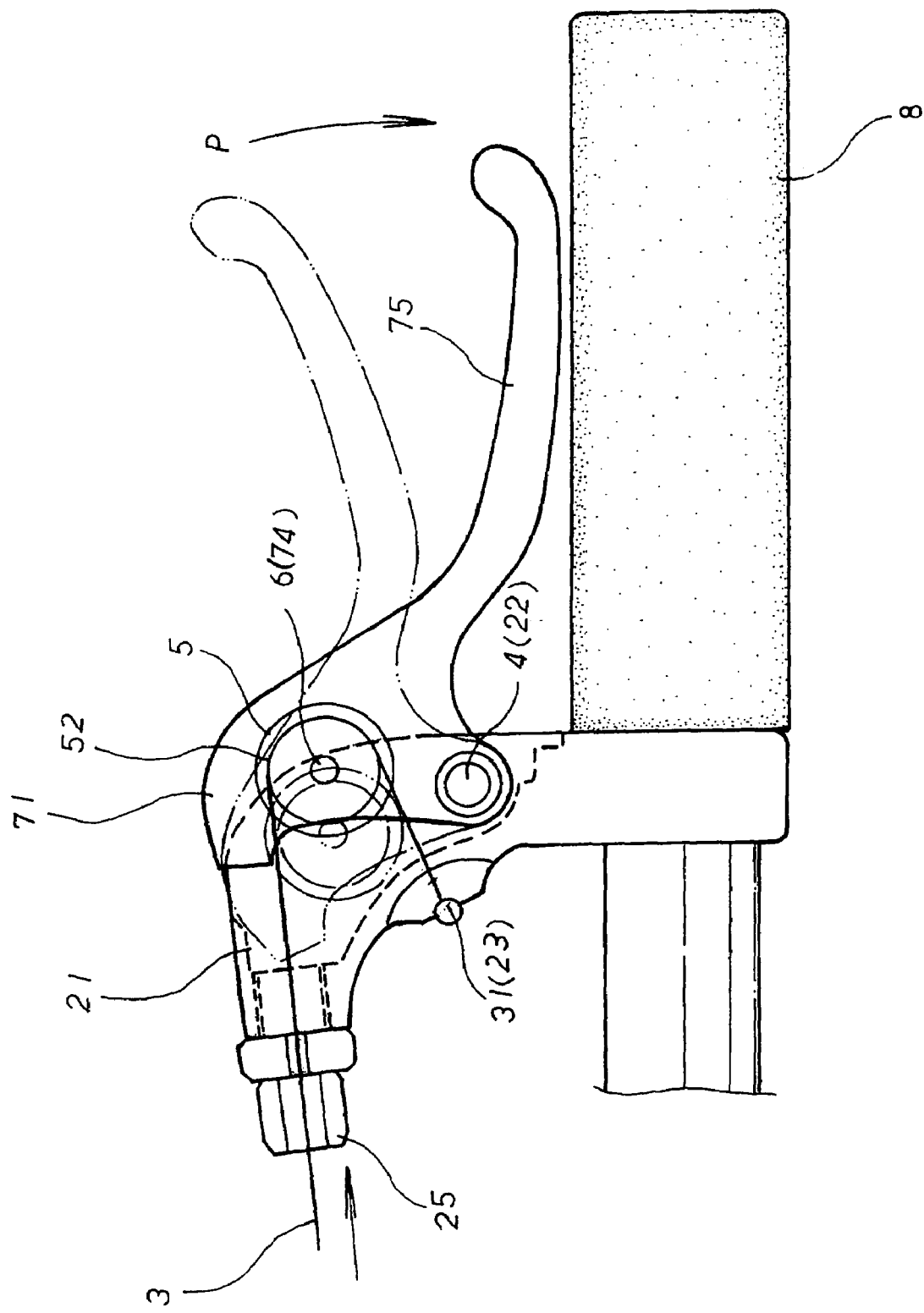
FIG. 4 is a plain view showing a handbrake operating device according to the present invention installed on a handlebar under an operated condition.

Please refer to FIGS. 3 and 4, which jointly show an operation scenario of the handbrake operating device according to the present invention. As illustrated in FIG. 3, when the operating lever 7 is not gripped, the roller wheel 5 is corded by the brake wire 3 so that the joining section 71 of the operating lever 7 remains embedded inside the trough member 21 of the main member 2, and a handle section 75 of the operating lever 7 stands a distance from the handlebar 8 of the bicycle. As illustrate in FIG. 4, the operating lever 7, when gripped under the exerted force P, pivots around the pin hole 22 and the joining section 71 moves away from the trough member 21. The roller wheel 5 as such is shifted to drag the brake wire 3. Please note that, during the roller wheel 5's dragging, the brake wire 3 is pulled nearly always along the roller wheel 5's tangent line and the rotation of the roller wheel 5 reduces the force P required.

Figure 5:
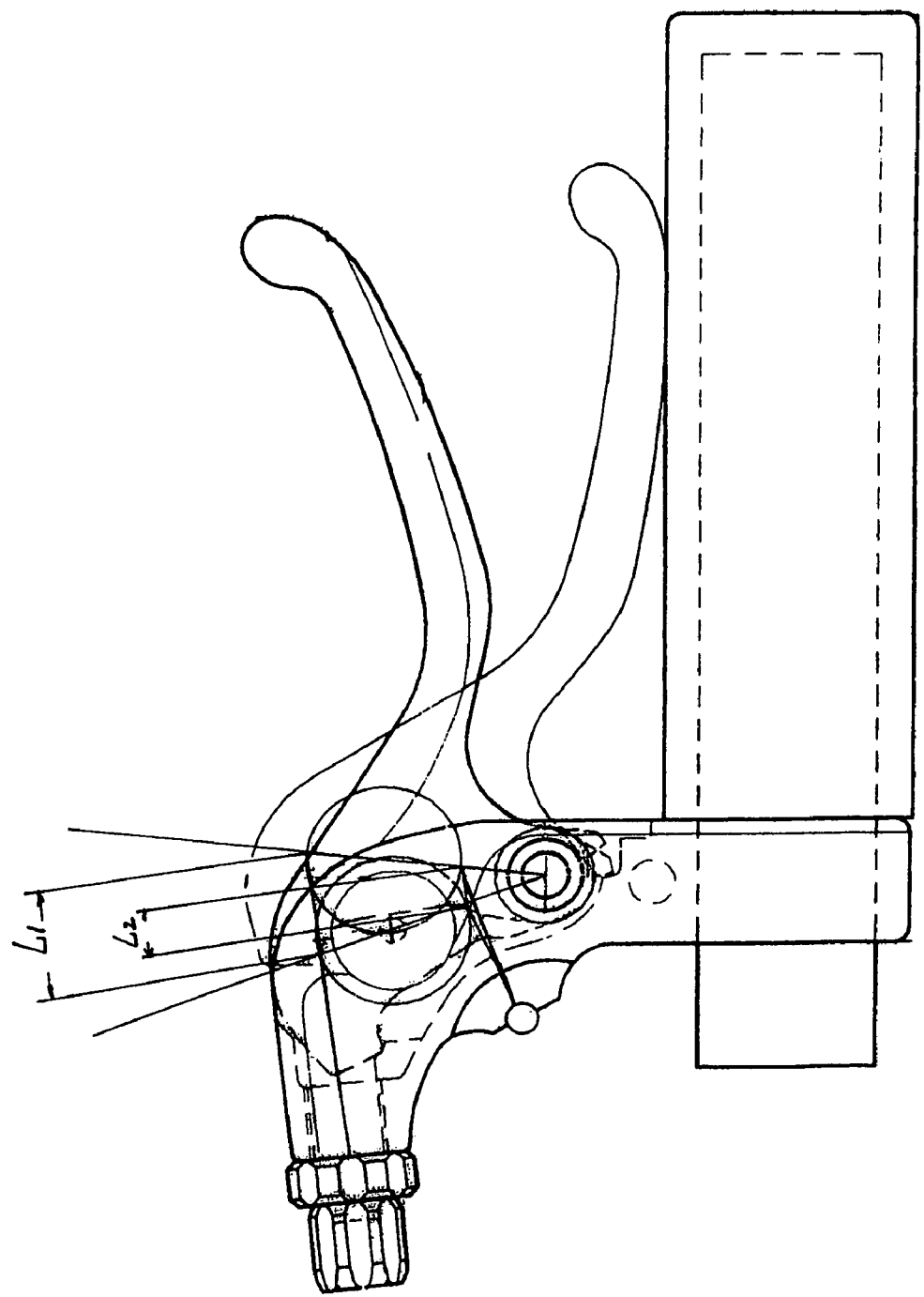
FIG. 5 is a plain view showing the pulling distance of the brake wire when a handbrake operating device according to the present invention is operated.
Figure 6:
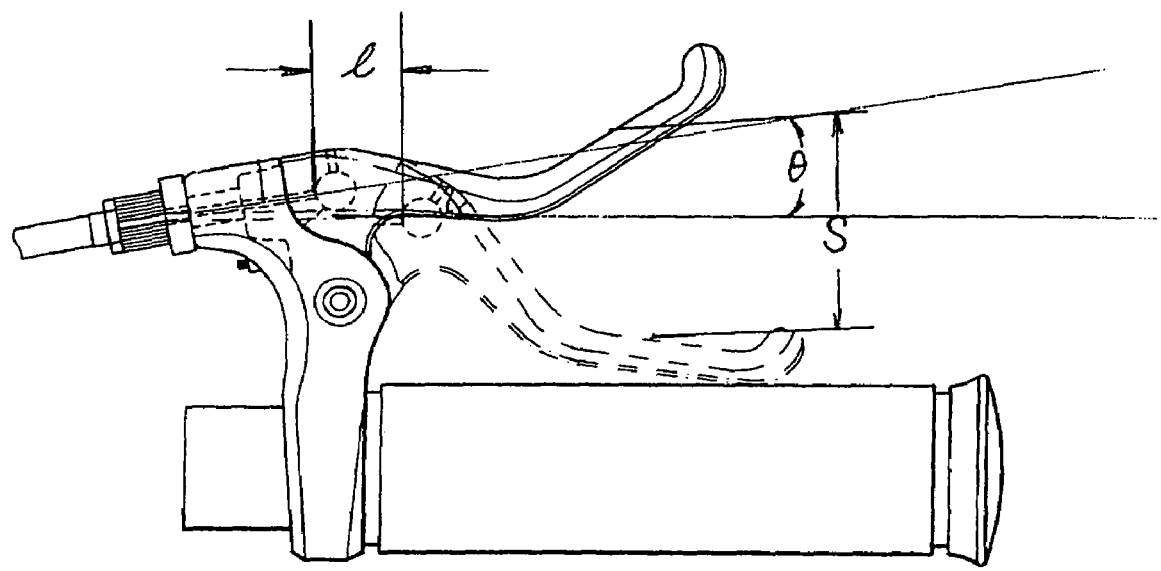
FIG. 6 is a plain view showing an operation scenario of a conventional bicycle handbrake operating device.

Please refer to FIG. 5, which is a plain view showing the pulling distance of the brake wire 3 when a handbrake operating device according to the present invention is operated. As illustrated, the brake wire 3 under the present invention would be pulled for a distance L1+L2 when the operating lever 7 is gripped for a distance S. For the same gripping distance S, as compared to the conventional handbrake operating device depicted in FIG. 6, the brake wire 3 of the present invention has an obviously longer pulling distance but with less exerted force.

In addition, the brake wire 3 is pulled along the tangent line of the roller wheel 5, and the brake wire 3 nearly remains a straight line and has almost no angular movement during the pull. The gripping and the restoration of position of the operating lever 7 are therefore smooth, and the brake wire 3 is not wear down after long period of use.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A bicycle handbrake operating device comprising a main member, a brake wire, a bolt member, a roller wheel, an axle member, and an operating lever;

wherein said operating lever has a joining section at one end; said joining section is fitted inside a trough member of said main member; said operating lever is pin-joined to said main member by installing a bolt through a pivoting hole of said operating lever and a pin hole in the middle of said main member; said bolt is locked by a nut; and said bicycle handbrake operating device is characterized in:

said main member has a curved trough at a side for holding a wire head of said brake wire; said curved trough has a wire hole allowing said brake wire to pass through said main member; a side of said joining section of said operating lever has a container trough for accommodating said roller wheel; said roller wheel is pin-joined to said operating lever by installing said axle member through an axle hole of said operating lever and a center hole of said roller wheel; said brake wire goes around said roller wheel along a wheel gorge of said roller wheel; said brake wire extends out through a mouth member of said main member; gripping said operating lever causes said roller wheel to shift which in turn pulls said brake wire along a tangent line of said roller wheel with generally no angular movement.

2. the bicycle handbrake operating device according to claim 1, wherein said roller wheel has a predetermined size corresponding to a specific bicycle.

* * * * *